United States Patent [19]
Rippberger

[11] Patent Number: 5,975,618
[45] Date of Patent: Nov. 2, 1999

[54] VEHICLE TONNEAU COVER CLAMP

[75] Inventor: Gary Rippberger, Elmore, Ohio

[73] Assignee: Saddleman, Inc., Logan, Utah

[21] Appl. No.: 08/738,994

[22] Filed: Oct. 24, 1996

[51] Int. Cl.[6] ........................................................ B60P 7/02
[52] U.S. Cl. .................... 296/100.18; 248/316.6
[58] Field of Search ........................ 296/100.01, 100.17, 296/100.18; 248/505, 503, 229.14, 316.6; 24/68 CD, 197, 200

[56] References Cited

U.S. PATENT DOCUMENTS

| | | | |
|---|---|---|---|
| 4,013,018 | 3/1977 | Hansen et al. | 296/100.1 X |
| 4,757,854 | 7/1988 | Rippberger | 160/391 |
| 4,792,179 | 12/1988 | Stevens | 296/100 |
| 5,261,719 | 11/1993 | Tucker | 296/100.18 |
| 5,472,256 | 12/1995 | Tucker | 296/100.18 |
| 5,540,475 | 7/1996 | Kersting et al. | 296/100.16 |
| 5,586,367 | 12/1996 | Benoit | 24/68 CD X |
| 5,636,893 | 6/1997 | Wheatley et al. | 248/316.6 X |
| 5,655,808 | 8/1997 | Wheatley | 296/100.17 |

OTHER PUBLICATIONS

Rail System Tonneau Cover II, Covercraft Industries, Inc.—printed 1993.
Extang—Saber Tonno—1994.
Custom Cover, Custom Form Mfg. Inc.
Craftec—Innovative Products Through Imagineering.
Reditruk, Tie Down System With Quick Tonneau.

Primary Examiner—D. Glenn Dayoan
Assistant Examiner—Jason Morrow
Attorney, Agent, or Firm—Thorpe, North & Western, LLP

[57] ABSTRACT

An improved tonneau cover clamp includes an inner clamp section for engaging a pickup truck bed sidewall, an outer clamp section configured to hold a tonneau cover rail to the sidewall, and a cam handle section for selectively attaching the inner clamp section to the outer clamp section so as to provide a clamping force on the sidewall. The cam handle section is configured to engage one or both of the other two sections in such a manner as to facilitate adjustment between the two sections to adjust to top flanges of sidewalls having different thicknesses, thereby enabling a single clamp to be used with a variety of different truck brands and models.

42 Claims, 3 Drawing Sheets

VEHICLE TONNEAU COVER CLAMP

BACKGROUND OF THE INVENTION

1. Field of the Invention

The present invention relates to a clamp for vehicle tonneau covers, and in particular, to an improved tonneau cover clamp for holding side rails to the sidewalls of a truck bed which readily adapts to sidewalls of different configurations.

2. State of the Art

The use of tonneau covers to cover pickup truck beds and other vehicle cavities has increased significantly in popularity in the last decade. The tonneau cover enable the user to conceal items carried in the pickup truck bed, and protect both the pickup truck bed and its contents from inclement weather.

As the use of tonneau covers increases, the demand for an easy to use, universal tonneau cover system increases. Originally, tonneau covers were attached to rails which were bolted or otherwise fastened to the sidewalls of the truck bed. The bolting of the rails to the sidewalls caused damage to the sidewalls and prevented the rapid installation or removal of the tonneau cover.

Recent improvements to tonneau cover attachment systems generally have abandoned the use of rails which bolt to the sidewalls of the truck bed. Rather, the new systems use clamps which have a first portion which fits under the top flange of the sidewall, and a second portion which fits over the top portion. A bolt is then used to draw the first and second portions together, thereby holding the tonneau cover rail and the top flange of the sidewall between the first and second portions.

One disadvantage of the currently available clamps is that they are generally configured to fit only one brand of truck. The clamps are generally unable to adapt to differing thicknesses and widths of the top flange which are present between different brands. Thus, when desiring to buy a tonneau cover, the user must find a dealer who has one configured for his or her brand of truck.

Another problem with the tonneau covers is that they require the use of tools to remove the railings from the sidewalls of the bed. Those having pickup trucks will appreciate, however, that it is not always possible to plan when the bed of the truck will be needed to carry items which cannot be stored below the tonneau cover. If the user of the truck does not have the correct tool present, time can be wasted seeking some one which the proper tools to disassemble the clamps.

Thus, there is a need for an improved tonneau cover clamp which will adapt to the sidewall configurations of numerous different brands of trucks and which may be assembled and disassembled without the use of tools.

SUMMARY OF THE INVENTION

Thus, it is an object of the present invention to provide a clamp for tonneau cover rails which does not require the use of tools to attach the rail to the sidewall of a pickup truck bed.

It is another object of the present invention to provide such a clamp which easily may be adapted to the different sidewall configurations of common brands of pickup trucks.

It is still another object of the present invention to provide such a clamp which is inexpensive and easy to use.

The above and other objects of the invention are realized in specific illustrated embodiments of an improved tonneau cover clamp including an inner clamp section for engaging a pickup truck bed sidewall, an outer clamp section configured to hold a tonneau cover rail to the sidewall, and a cam handle section for selectively attaching the inner clamp section to the outer clamp section so as to provide clamping force on the sidewall. The cam handle section is configured to engage one or both of the other two sections in such a manner as to facilitate adjustment between the two sections to adjust to top flanges of sidewalls having different thicknesses, thereby facilitating use of the clamp with trucks having different sidewall configurations.

In accordance with one aspect of the present invention, the outer clamp section is configured to engage a tonneau cover rail at various locations to further adapt to the various sidewall configurations of different truck brands, and to enable adjustment of the tonneau cover to ensure that it is held taut across the bed of the pickup truck.

In accordance with yet another aspect of the present invention, the cam handle section is configured to securely hold the outer clamp section and the inner clamp section in a desired configuration under normal operating conditions, and to enable the user to release the inner and outer clamp sections without the use of tools.

In accordance with still another aspect of the present invention, respective portions of the clamp are covered with resilient/cushioning material to prevent the clamp from marring the paint on the sidewall of the pickup truck bed.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1A:
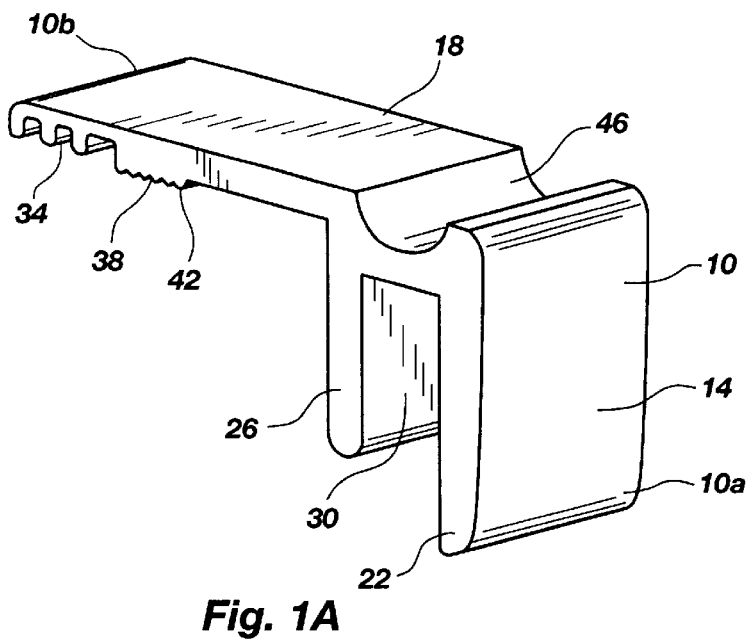
FIG. 1A shows a perspective view of an outer clamp section of the present invention.
Figure 1C:
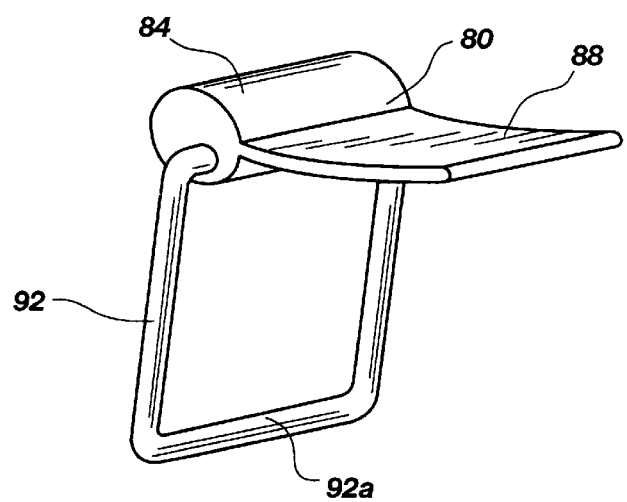
FIG. 1C shows a perspective view of a cam handle section used to hold the outer clamp section and the inner clamp section together.
Figure 1B:
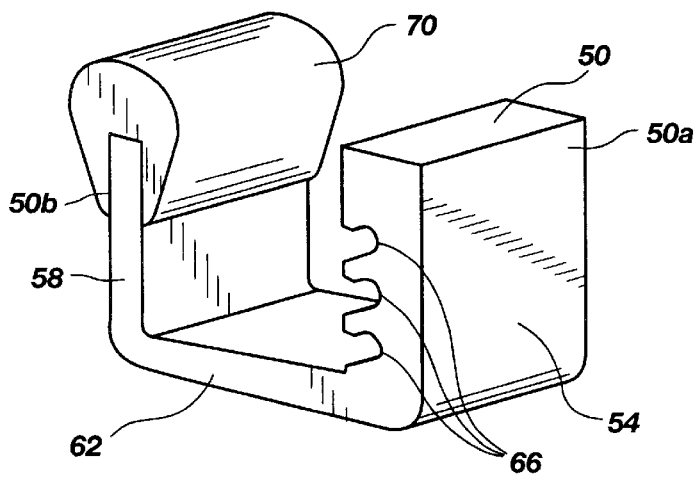
FIG. 1B shows a perspective view of an inner clamp section of the present invention.

Referring to FIGS. 1A through 1C, there are shown three respective sections of a clamp of the present invention. Specifically, in FIG. 1A there is shown an outer clamp section 10. A first end 10a of the outer clamp section 10 includes a generally vertical portion 14, and an opposing second end lob includes a generally horizontal portion 18. The generally vertical portion 14 includes first and second walls 22 and 26, respectively, which are spaced and positioned so as to define a channel 30 for receiving a portion of an inner clamp section (FIG. 1B) discussed below.

The generally horizontal portion 18 of the outer clamp section 10 extends at an angle of approximately 90 degrees. Those skilled in the art, however, will appreciate that numerous other angles may be used. Disposed on the generally horizontal portion 18 of the outer clamp section 10 are a plurality of ribs 34. The ribs 34 are disposed in such a manner that they engage a rib of a tonneau cover rail to prevent the rail from sliding. Additional discussion of the ribs 34 is provided with respect to FIG. 2B.

Also disposed along an underside of the horizontal portion 18 is a gripping mechanism 38 formed by a plurality of teeth 42. As will be discussed in additional detail with respect to FIG. 2B, the teeth 42 apply a compressive force in conjunction with a pad of the inner clamp section (FIG. 1B) to secure the rail in place.

Also shown in FIG. 1A is a cam cavity 46 disposed adjacent the junction between the generally vertical portion 14 and the generally horizontal portion 18. The cam cavity 46 receives a cam handle section (FIG. 1C) to hold the outer clamp section 10 and the inner clamp section (FIG. 1B) together and to apply the compressive force necessary to hold a tonneau rail in place.

Referring now to FIG. 1B, there is shown a perspective view of the inner clamp section 50 of the clamp. The inner clamp section 50 is generally U-shaped and includes a first generally vertical wall 54 at a first end 50*a*, a second generally vertical wall 58 at a second end 50*b*, and a base wall 62 for separating the first and second generally vertical walls.

The first generally vertical wall 54 is configured to nest within the channel 30 formed by the first wall 22 and the second wall 26 of the vertical portion 14 of the outer clamp section 18 shown in FIG. 1A. The first generally vertical wall 54 has a plurality of elongate slots 66 formed therein. The slots 66 selectively receive a portion of the cam handle section (FIG. 1C). As will be discussed in additional detail with respect to FIGS. 2A and 2B, the slots 66 enable adjustment of the position of the cam handle section to the inner clamp section 50, thereby facilitating adjustment of the outer clamp section 10 with respect to the inner clamp section.

Disposed on the second generally vertical wall 58 is a pad 70. The pad 70 is preferably made out of a resilient material, such as rubber, which facilitates the holding of the clamp in place when the pad is used to apply a compressive force to a sidewall of a truck bed or similar structure. For reasons which will be discussed below, the pad 70 is preferably spaced from the first generally vertical wall 54 an appropriate distance so that the pad is disposed opposite the teeth 42 of the gripping mechanism 38 when the first generally vertical wall 54 is nested within the channel 30 in the vertical portion 14 of the outer clamp section 10. Additionally, the base wall 62 should be long enough to adapt to the different widths of the top flange of the sidewall on which the tonneau cover rail is held.

In order to hold the outer clamp section 10 to the inner clamp section 50 in order to form a clamp which will hold a rail for a tonneau cover in place, a cam handle section 80 is provided. The cam handle section 80 includes a cam 84 which nests within the cam cavity 46 of the outer clamp section 10. A handle 88 is provided for rotating the cam 84 with respect to the cam cavity 46. Preferably, the handle 88 is attached at 5 degrees past center so that the tension is created when the cam 84 is rotated into a first locking position.

A bail-loop 92 extends from the cam 84, and a bottom portion 92*a* of the bail-loop is configured to selectively nest in the slots 66 formed in the first generally vertical wall 54 of the inner clamp section 50. By selecting which of the slots 66 the bottom portion 92*a* of the bail-loop 92 is nested in, the user can control the relative distance between the teeth 42 of the gripping mechanism 38 of the outer clamp section 10, and the pad 70 of the inner clamp section 50. Because the pad 70 is resilient, a fewer number of slots 66 may be used while still providing a secure hold over a range of distances between the pad and the gripping mechanism 38.

To ensure that the bail-loop 92 does not accidentally slide out of the slots 66, the slots are disposed to extend inwardly and upwardly into the first generally vertical wall 54. While the angle of the slots is sufficient to ensure that the bottom portion 92*a* of the bail-loop 92 is not accidentally removed, they are at a shallow enough angle that they provide virtually no interference with removal of the bottom portion of the bail-loop once the cam 84 has been rotated into an open position.

To provide a durable clamp which is light weight, durable, and easy to manufacture, the outer clamp section 10, the inner clamp section 50 and the cam 84 and handle 88 will typically be made out of aluminum. While other materials such as steel and carbon-fiber resins may be used, aluminum is currently preferred because of cost, durability and related factors.

The only portions of the clamp as shown in FIGS. 1A through 1C which are not made of aluminum are the pad 70, which is made of a resilient material, and the bail-loop 92, which is typically made of 10 gauge stainless steel wire.

Figure 2A:
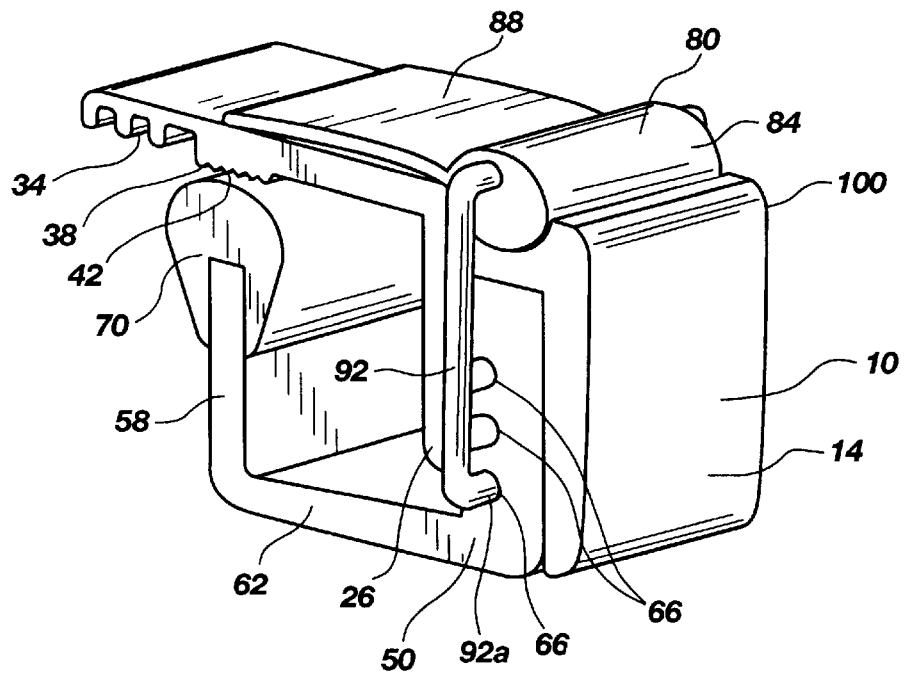
FIG. 2A shows a perspective view of the outer clamp section, the inner clamp section and the cam handle section disposed in an assembled configuration.

Turning now to FIG. 2A, there is shown a perspective view of a clamp 100 assembled from the outer clamp section 10 (FIG. 1A), the inner clamp section 50 and the cam handle section 80. As shown in FIG. 2A, the handle 88 attached to the cam 84 is rotated into the first, closed position. In such a position, the cam 84 applies a downward force on the outer clamp section 10 relative to the inner clamp section 50. Likewise, the bail-loop 92 is configured and attached to the cam 84 in such a manner that the rotation of the cam into the first, closed position, lifts the bail-loop upwardly, and draws the bottom portion 92*a* firmly into the slot 66. Correspondingly, the bottom portion 92*a* forces the inner clamp section 50 upwardly respective to the outer clamp section 10.

Such a movement between the outer clamp section 10 and the inner clamp section 50 draws the gripping mechanism 38 and the pad 70 toward each other. When a sidewall of a pickup truck bed or the like is disposed between the gripping mechanism 38 and the pad 70, the clamp is held in place. More importantly, a tonneau cover rail (FIG. 2B) resting on the pickup truck sidewall is held firmly in place without requiring bolts and causing minimal damage to the paint and metal of the sidewall.

If the sidewall is too thick or too thin, the handle 88 of the cam handle section 80 need only be rotated into a second, open position to release the bottom portion 92*a* of the bail-loop 92 from the slot 66 in which it is held, and slid to another slot to thereby facilitate moving of the pad 70 and gripping mechanism 38 either closer together or further apart. Handle 88 of the cam handle section 80 is then rotated back into the first, closed position shown in FIG. 2A to thereby secure the relative positions of the outer clamp section 10 and the inner clamp section 50.

Figure 2B:
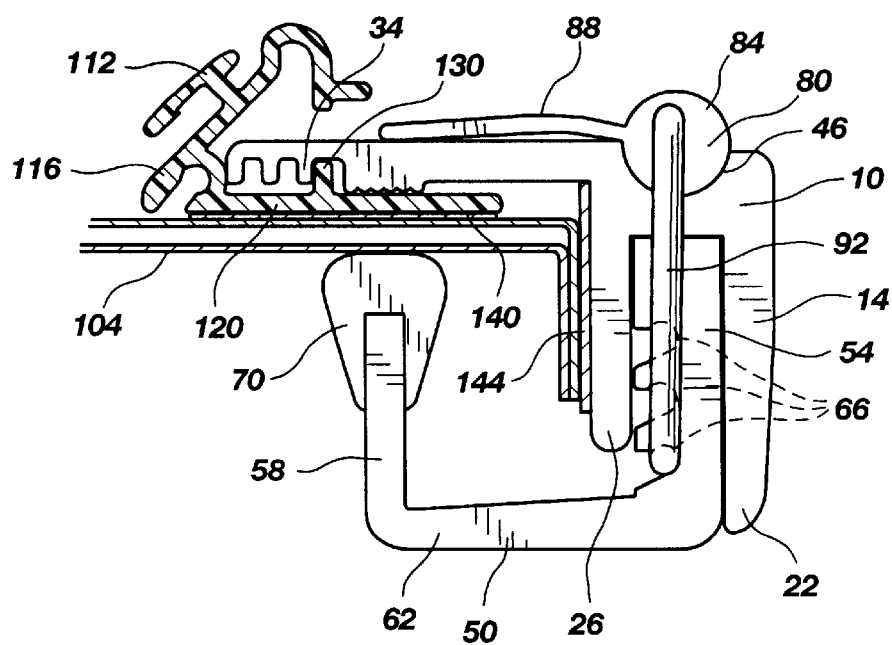
FIG. 2B shows a side view of the clamp shown in FIG. 2A, and a cross-sectional view of a tonneau rail being held to the sidewall of a truck by the clamp.

Referring now to FIG. 2B, there is shown a side view of the clamp 100 mounted on the top flange 104 of a sidewall of a pickup truck bed. As shown in FIG. 2B, the flange 104 of the sidewall of the pickup truck bed is relatively thin. Those familiar with tonneau covers will realize that there is a great variety in the thickness and width of the top flange of the sidewall between truck brands, and even within different truck sizes of the same brand.

Also shown in FIG. 2B is a tonneau cover rail 112. The tonneau cover rail 112 includes an upper portion 116 onto which the tonneau cover is attached. A bottom portion 120 of the tonneau cover rail 112 is configured to rest on the top flange 104. While it has been common place to bolt the tonneau cover rail 112 to the top flange 104 of the sidewall of a the truck bed, bolting the tonneau cover rail inhibits removal of the rail when desired, and leaves bolt holes or other marks in the top flange—a very visible location. The current use of clamps is an improvement, but the necessity of having the correct tool present limits the ability to assemble or disassemble the tonneau cover whenever desired.

By utilizing the clamp of the present invention, the tonneau cover rail 112 can be held in place on the top flange 104 of the sidewall when desired, and then removed simply by releasing the clamps 100 used to hold it in place. This is done simply by pulling on the handle 88 attached to the cam 84 with sufficient force to overcome the tension created by the cam's position in conjunction with the handle.

To inhibit sliding of the tonneau cover rail 112 with respect to the top flange 104 of the sidewall, a rib 130 extends upwardly from the rail. The rib 130 of the tonneau cover rail 112 nests between the ribs 34 of the outer clamp section 10 to prevent lateral movement by the rail. Additionally, because a plurality of ribs 34 are provided on the outer clamp section 10, the position of the tonneau cover rail 112 along the top flange 104 of the sidewall can be adjusted to achieve a desired spacing between tonneau cover rails on opposing sides of the truck bed or otherwise adapt to the sidewalls.

To prevent the tonneau cover rail 112 from damaging the paint on the top flange 104 of the sidewall, a cushioning material 140 is disposed on the bottom of the bottom portion of the tonneau cover rail. Likewise, a cushioning pad 144 may be placed on the second wall 26 of the vertical portion 14 of the outer clamp section 10. In such a manner, the tonneau cover rail 112 is conveniently and securely held to the top flange 104 of the sidewall without marring the paint.

When a user decides to remove the tonneau cover rail, the handle 88 is rotated (clockwise in FIG. 2B) to rotate the cam 84 in the cam cavity 46 of the outer clamp section 10. As the cam rotates, the pressure holding the bottom portion 92a of the bail-loop 92 is loosened, the bottom portion may be slid out of the slot 66 in which it has been held. Once the bottom portion 92a of the bail-loop 92 is out of the slot 66, the first generally vertical wall 54 of the inner clamp section 50 can be slid out from the channel 30 between the first and second walls 22 and 26 of the outer clamp section 10. Sliding the first generally vertical wall 54 out of the channel 30 moves the pad 70 away from the gripping mechanism 38 and thereby releases the top flange 104 of the sidewall.

As will be appreciated by the above disclosure, all of these functions can be carried out without the use of tools. This enables a user to remove the tonneau cover rails 112 wherever desired. Thus, the tonneau cover which connects to the tonneau cover rails 112 can easily be moved between vehicles, or attached/detached within a matter of minutes.

Figure 3:
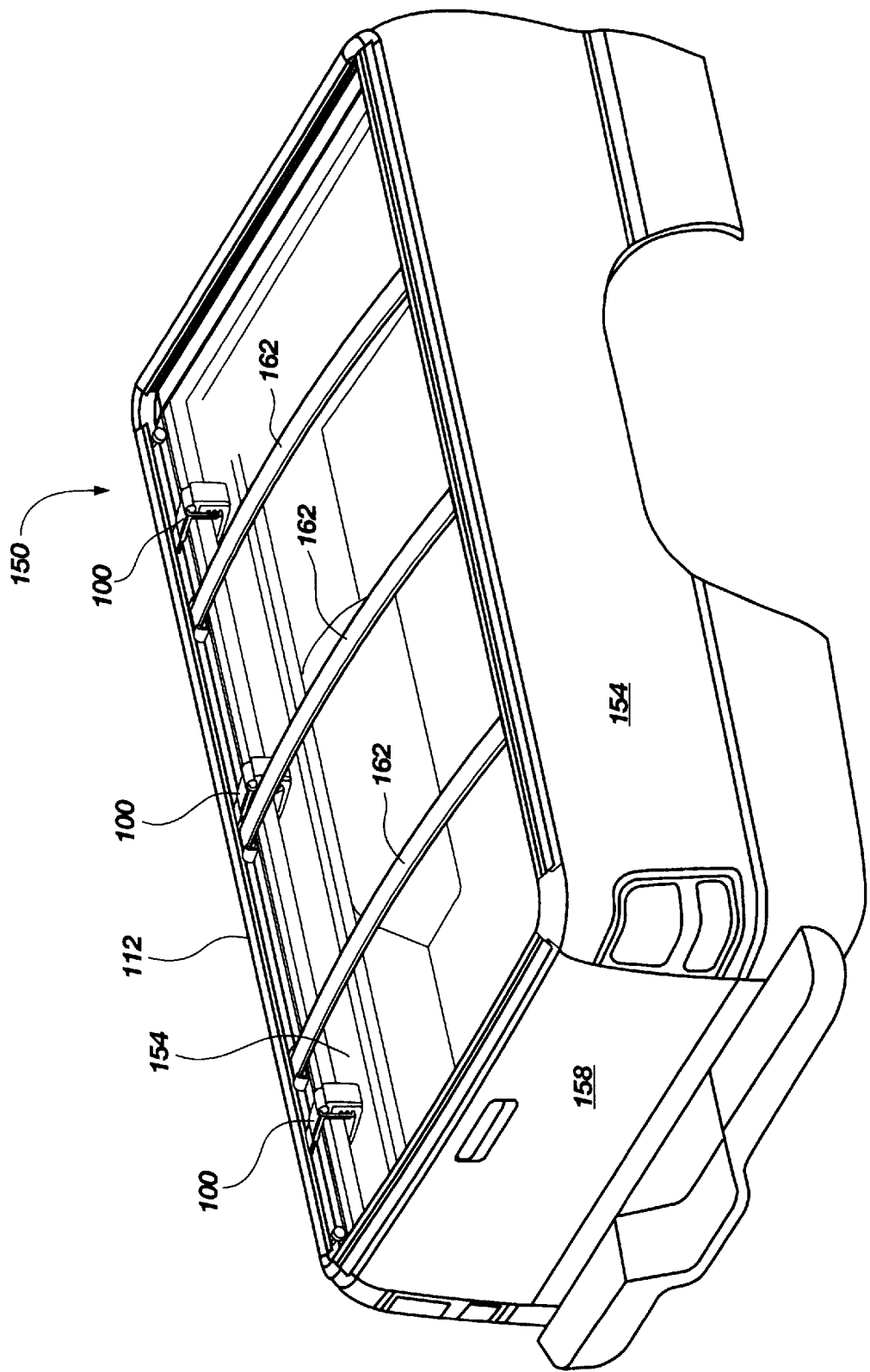
FIG. 3 shows a perspective view of a pickup truck bed with a tonneau cover frame disposed therein in accordance with the teachings of the present invention.

Referring now to FIG. 3, there is shown a perspective view of a pickup truck bed, generally indicated at 150. Disposed along the top of the sidewalls 154 and the tailgate 158 are tonneau rail covers 112. To ensure a secure hold between the rails 112 and the sidewalls 154, three clamps 100 are typically used on each side. Because no tools are needed to attach the clamps, the rail 112 can be secured in place in less than one minute simply by sliding the clamps into place and using the handle (FIGS. 1C–2B) to rotate the cam (FIG. 1C–2B).

Extending across the bed 150 are a plurality of supports 162 which are anchored at each end to the tonneau cover rails 112. The supports help to prevent sagging in the tonneau cover, thereby extending its useful life.

Those skilled in the art will appreciate the significant improvement which the clamp of the present invention provides over the prior art. While the clamps of the prior art required tools to attach and were generally configured for attachment to only one brand or size of truck, the present invention allows for attachment of a tonneau cover system without the use of tools and to almost any brand of truck. If the top flange of the trucks sidewall is thick, the cam handle section 80 need only be released, and the bottom portion 92a of the bail-loop moved into an upper slot 66 in the first generally vertical wall 54 of the inner clamp section 50. Thus, the bail-loop forms an adjustment mechanism for adjusting the respective positions of the clamps. The U-shaped inner clamp section 50 and the elongate outer clamp section 10 also facilitate attachment to a variety of top flange widths. Of course, numerous modifications may be made, such as reversing which of the clamp sections is engaged by the bail-loop 92, and the position of the cam.

In addition to convenience for the user, the ability to use a single clamping mechanism for a variety of different truck brands is beneficial to auto parts dealers. Rather than needing to carry numerous different clamping configurations, a single clamp can be used for each size of cover.

Thus there is disclosed an improved vehicle tonneau cover clamp and a tonneau cover rail for use with the same. Those skilled in the art will appreciate numerous modifications which may be made without departing from the scope and spirit of the present invention. The appended claims are intended to cover such modifications.

What is claimed is:

1. A clamp for attaching a tonneau cover rail to a sidewall of a truck, the clamp comprising:

an outer clamp section having a first end configured for engaging an inner clamp section, and a second end configured for engaging a tonneau cover rail;

an inner clamp section nestably engaging the outer clamp section, the inner clamp section having a first end for engaging the outer clamp section, a second end disposed opposite the first end for engaging a sidewall of a truck, and a plurality of slots, a cam handle section for selectively connecting the outer clamp section and the inner clamp section, the cam handle section having a cam moveable between a first, closed position wherein the outer clamp section and the inner clamp section are drawn together with sufficient clamping force to hold a tonneau cover rail to a truck sidewall, and a second, open position, wherein the outer clamp section and the inner clamp section are not drawn together, and a handle for selectively moving the cam between the first, closed position and the second open position, and adjustment means for selectively controlling the distance between the second end of the outer clamp section and the second end of the inner clams section, said adjustment means comprising a bail-loop extending downwardly from the cam for selectively nesting in the slots of the inner clamp section.

2. The clamp of claim 1, wherein the outer clamp section comprises a generally vertical portion having a channel formed therein for receiving a portion of the inner clamp section.

3. The clamp of claim 2, wherein the inner clamp section comprises a first generally vertical wall configured for nesting in the channel of the generally vertical portion of the outer clamp section.

4. The clamp of claim 3, wherein the first generally vertical wall has a plurality of slots formed therein for selectively receiving a portion of the bail-loop.

5. The clamp of claim 4, wherein rotation of the cam moves the bail-loop, thereby moving the first generally vertical wall within the channel.

6. The clamp of claim 4, wherein the plurality of slots in the first generally vertical wall of the inner clamp section are disposed such that the extent to which the first generally vertical wall nests within the channel is dependent on which slot the bail-loop engages.

7. The clamp of claim 1, wherein the second end of the outer clamp section includes a gripping mechanism for gripping a tonneau cover rail, the gripping mechanism comprising a plurality of teeth.

8. A tonneau cover rail clamping system comprising
at least one clamp for attaching a tonneau cover rail to a sidewall of a truck, the clamp comprising:
an outer clamp section having a first end configured for engaging an inner clamp section, and a second end configured for engaging a tonneau cover rail;
an inner clamp section nestably engaging the outer clamp section, the inner clamp section having a first end for engaging the outer clamp section, a second end disposed opposite the first end for engaging a sidewall of a truck, and a plurality of slots,
a cam handle section for selectively connecting the outer clamp section and the inner clamp section, the cam handle section having a cam moveable between a first, closed position wherein the outer clamp section and the inner clamp section are drawn together with sufficient clamping force to hold a tonneau cover rail to a truck sidewall, and a second, open position, wherein the outer clamp section and the inner clamp section are not drawn together, and a handle for selectively moving the cam between the first, closed position and the second open position, and
adjustment means for selectively controlling the distance between the second end of the outer clamp section and the second end of the inner clamp section, said adjustment means comprising a bail-loop extending downwardly from the cam for selectively nesting in the slots of the inner clamp section, and
a tonneau cover rail having at least one first rib disposed thereon, and wherein the second end of the outer clamp section comprises at least one second rib for engaging the at least one first rib of the tonneau cover rail.

9. The tonneau cover rail clamping system of claim 8, wherein the at least one second rib comprises a plurality of ribs configured such that the at least one first rib of the tonneau cover rail nests between the ribs.

10. The clamp of claim 1, wherein the inner clamp section is generally U-shaped.

11. The clamp of claim 1, wherein the second end of the inner clamp section comprises a pad configured for engaging an underside of a top flange of a sidewall of a pickup truck.

12. The clamp of claim 11, wherein the pad is resilient.

13. The clamp of claim 1, wherein the outer clamp section includes a cam cavity for receiving the cam of the cam handle section.

14. A clamp for holding a tonneau cover rail to a sidewall of a truck, the clamp comprising:
an outer clamp member having a generally vertical portion and a generally horizontal portion, the vertical portion having a channel formed therein for receiving a portion of an inner clamp member, and the horizontal portion being configured for selectively engaging a tonneau cover rail;
an inner clamp member having a U-shape with first and second generally vertical walls and a base wall for separating the generally vertical walls, the first generally vertical wall being configured for nestably sliding within the channel of the generally vertical portion of the outer clamp section, and the second generally vertical wall being configured for engaging a sidewall of a truck; and
a cam handle section for selectively holding the outer clamp section and the inner clamp section together, the cam handle section comprising a cam positionable adjacent one of the clamp sections, and an adjustment mechanism attached to the cam and for engaging the other clamp section so as to draw the two clamp sections toward one another when the cam is rotated.

15. The clamp of claim 14, wherein the outer clamp section has a cam cavity formed therein for receiving the cam of the cam handle section.

16. The clamp of claim 14, wherein the adjustment means of the cam handle section comprises a bail-loop, and wherein the first generally vertical wall has a plurality of slots disposed therealong for selectively receiving the bail-loop.

17. The clamp of claim 16, wherein the slots extend upwardly at an angle into the first generally vertical wall.

18. The clamp of claim 14, wherein the outer clamp section comprises a plurality of ribs and a gripping mechanism having a plurality of teeth for engaging a tonneau cover rail.

19. The clamp of claim 14, wherein the inner clamp includes a resilient pad disposed on the second generally vertical wall for engaging a sidewall of a truck.

20. A clamp for attaching a tonneau cover rail to a sidewall of a truck, the clamp comprising:
an outer clamp section having a first end configured for engaging an inner clamp section, and a second end configured for engaging a tonneau cover rail;
an inner clamp section nestably engaging the outer clamp section, the inner clamp section having a first end for engaging the outer clamp section, a second end disposed opposite the first end for engaging a sidewall of a truck and a plurality of slots;
a cam handle section for selectively connecting the outer clamp section and the inner clamp section, the cam handle section having a cam moveable between a first, closed position wherein the outer clamp section and the inner clamp section are drawn together with sufficient clamping force to hold a tonneau cover rail to a truck sidewall, and a second, open position, wherein the outer clamp section and the inner clamp section are not drawn together, and a handle for selectively moving the cam between the first, closed position and the second open position, adjustment means for selectively controlling the distance between the second end of the outer clamp section and the second end of the inner clamp section, said adjustment means comprising a bail-loop extending downwardly from the cam for selectively nesting in the slots of the inner clamp section, and wherein the outer clamp section includes a cam cavity for receiving the cam of the cam handle section.

21. The clamp of claim 20, wherein the outer clamp section comprises a generally vertical portion having a channel formed therein for receiving a portion of the inner clamp section.

22. The clamp of claim 21, wherein the inner clamp section comprises a first generally vertical wall configured for nesting in the channel of the generally vertical portion of the outer clamp section.

23. The clamp of claim 22, wherein the first generally vertical wall has a plurality of slots formed therein for selectively receiving a portion of the bail-loop.

24. The clamp of claim 23, wherein rotation of the cam moves the bail-loop, thereby moving the first generally vertical wall within the channel.

25. The clamp of claim 23, wherein the plurality of slots in the first generally vertical wall of the inner clamp section are disposed such that the extent to which the first generally vertical wall nests within the channel is dependent on which slot the bail-loop engages.

26. The clamp of claim 20, wherein the second end of the outer clamp section includes a gripping mechanism for gripping a tonneau cover rail, the gripping mechanism comprising a plurality of teeth.

27. The clamp of claim 20, wherein the inner clamp section is generally U-shaped.

28. The clamp of claim 20, wherein the second end of the inner clamp section comprises a pad configured for engaging an underside of a top flange of a sidewall of a pickup truck.

29. The clamp of claim 28, wherein the pad is resilient.

30. A clamp for attaching a tonneau cover rail to a sidewall of a truck, the clamp comprising:

an outer clamp section having a first end configured for engaging an inner clamp section, and a second end configured for engaging a tonneau cover rail;

an inner clamp section nestably engaging the outer clamp section, the inner camp section having a first end for engaging the outer clamp section, a second end disposed opposite the first end for engaging a sidewall of a truck and comprising a plurality of slots;

a cam handle section for selectively connecting the outer clamp section and the inner clamp section, the cam handle section having a cam moveable between a first, closed position wherein the outer clamp section and the inner clamp section are drawn together with sufficient clamping force to hold a tonneau cover rail to a truck sidewall, and a second, open position, wherein the outer clamp section and the inner clamp section are not drawn together, and a handle for selectively moving the cam between the first, closed position and the second open position, and wherein the clamp further comprises adjustment means for selectively controlling the distance between the second end of the outer clamp section and the second end of the inner clamp section, said adjustment means comprising a bail-loop extending downwardly from the cam for selectively nesting in the slots of the inner clamp section.

31. The clamp of claim 30, wherein the outer clamp section comprises a generally vertical portion having a channel formed therein for receiving a portion of the inner clamp section.

32. The clamp of claim 31, wherein the inner clamp section comprises a first generally vertical wall configured for nesting in the channel of the generally vertical portion of the outer clamp section.

33. The clamp of claim 32, wherein the cam handle section further comprises a bail-loop extending downwardly from the cam, and wherein the first generally vertical wall has a plurality of slots formed therein for selectively receiving a portion of the bail-loop.

34. The clamp of claim 33, wherein rotation of the cam moves the bail-loop, thereby moving the first generally vertical wall within the channel.

35. The clamp of claim 33, wherein the plurality of slots in the first generally vertical wall of the inner clamp section are disposed such that the extent to which the first generally vertical wall nests within the channel is dependent on which slot the bail-loop engages.

36. The clamp of claim 30, wherein the second end of the outer clamp section includes a gripping mechanism for gripping a tonneau cover rail, the gripping mechanism comprising a plurality of teeth.

37. A tonneau cover rail clamping system comprising at least one clamp for attaching a tonneau cover rail to a sidewall of a truck, the clamp comprising:

an outer clamp section having a first end configured for engaging an inner clamp section, and a second end configured for engaging a tonneau cover rail;

an inner clamp section nestably engaging the outer clamp section, the inner camp section having a first end for engaging the outer clamp section, a second end disposed opposite the first end for engaging a sidewall of a truck, and a plurality of slots;

a cam handle section for selectively connecting the outer clamp section and the inner clamp section, the cam handle section having a cam moveable between a first, closed position wherein the outer clamp section and the inner clamp section are drawn together with sufficient clamping force to hold a tonneau cover rail to a truck sidewall, and a second, open position, wherein the outer clamp section and the inner clamp section are not drawn together, and a handle for selectively moving the cam between the first, closed position and the second open position;

wherein the clamp further comprises adjustment means for selectively controlling the distances between the second end of the outer clamp section and the second end of the inner clamp section, said adjustment means comprising a bail-loop extending downwardly from the cam for selectively nesting in the slots of the inner clams section; and a tonneau cover rail having at least one first rib disposed thereon, and wherein the second end of the outer clamp section comprises at least one second rib for engaging the at least one first rib of the tonneau cover rail.

38. The tonneau cover rail clamping system of claim 37, wherein the at least one second rib comprises a plurality of ribs configured such that the at least one first rib of the tonneau cover rail nests between the ribs.

39. The clamp of claim 30, wherein the inner clamp section is generally U-shaped.

40. The clamp of claim 30, wherein the second end of the inner clamp section comprises a pad configured for engaging an underside of a top flange of a sidewall of a pickup truck.

41. The clamp of claim 40, wherein the pad is resilient.

42. The tonneau cover rail clamping system of claim 37, wherein the outer clamp section includes a cam cavity for receiving the cam of the cam handle section.

* * * * *